(12) United States Patent
Clow, II et al.

(10) Patent No.: US 10,977,080 B2
(45) Date of Patent: Apr. 13, 2021

(54) RESOURCE INSTRUMENT FOR PROCESSING A REAL-TIME RESOURCE EVENT

(71) Applicant: BANK OF AMERICA CORPORATION, Charlotte, NC (US)

(72) Inventors: Richard C. Clow, II, Morristown, NJ (US); Joseph Benjamin Castinado, North Glenn, CO (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 79 days.

(21) Appl. No.: 16/262,318

(22) Filed: Jan. 30, 2019

(65) Prior Publication Data

US 2020/0241923 A1    Jul. 30, 2020

(51) Int. Cl.
G06F 9/50    (2006.01)
G06F 9/54    (2006.01)
H04L 29/06   (2006.01)

(52) U.S. Cl.
CPC ............ *G06F 9/5011* (2013.01); *G06F 9/542* (2013.01); *H04L 63/083* (2013.01)

(58) Field of Classification Search
CPC ....... G06F 9/5011; G06F 9/542; H04L 63/083
USPC ....................................................... 718/104
See application file for complete search history.

(56) References Cited

U.S. PATENT DOCUMENTS

| | | | |
|---|---|---|---|
| 5,125,091 A | 6/1992 | Staas, Jr. et al. | |
| 6,502,133 B1 | 12/2002 | Baulier et al. | |
| 6,594,647 B1 | 7/2003 | Randle et al. | |
| 6,681,236 B2 | 1/2004 | Jacquet et al. | |
| 7,016,361 B2 | 3/2006 | Swonk et al. | |
| 7,606,594 B2 | 10/2009 | Jesse et al. | |
| 7,979,368 B2 | 7/2011 | Kapoor et al. | |
| 8,402,540 B2 | 3/2013 | Kapoor et al. | |
| 8,626,659 B1 | 1/2014 | Bowman et al. | |
| 9,525,696 B2 | 12/2016 | Kapoor et al. | |
| 10,185,946 B2 | 1/2019 | Bowman et al. | |
| 2002/0091991 A1 | 7/2002 | Castro | |

(Continued)

FOREIGN PATENT DOCUMENTS

WO    2017014815 A1    1/2017

*Primary Examiner* — John Q Chavis
(74) *Attorney, Agent, or Firm* — Michael A. Springs; Moore & Van Allen PLLC; James C. Edwards

(57) ABSTRACT

Embodiments of the invention are directed to classifying requests associated with personal data at or before a point of entry to a trusted computing network. The invention provides for determining whether a request associated with personal data requires classification (for example, whether the request is impacted by regulations or other requirements necessitating classification/categorization). The determination may be based on what entity is requesting the data, the origin of the request, whose data is being requested, the type of action associated with the request and/or the data elements associated with the request. In addition, once the request has been determined to require classification the specific classification is determined and assigned to the request. The classification may be determined based on the rules associated with the regulation or other requirement(s) necessitating the classification/categorization. The classification may identify rules for processing the request along with routing for the request.

11 Claims, 11 Drawing Sheets

(56) References Cited

U.S. PATENT DOCUMENTS

| | | |
|---|---|---|
| 2003/0050879 A1 | 3/2003 | Rosen et al. |
| 2008/0229415 A1 | 9/2008 | Kapoor et al. |
| 2011/0320358 A1 | 12/2011 | Harris et al. |
| 2012/0136781 A1 | 5/2012 | Fridman et al. |
| 2014/0032399 A1 | 1/2014 | Gonthier et al. |
| 2014/0344150 A1 | 11/2014 | Kapur |
| 2015/0052645 P1 | 2/2015 | Grosser |
| 2015/0178709 A1 | 6/2015 | Keenan et al. |
| 2015/0193748 A1 | 7/2015 | Pentel |
| 2015/0242699 A1* | 8/2015 | Wang ................ G06K 9/4633 382/170 |
| 2016/0086108 A1* | 3/2016 | Abelow ............... G06Q 10/10 705/7.29 |
| 2017/0195994 A1* | 7/2017 | Cole .................... G06Q 40/02 |
| 2017/0221066 A1 | 8/2017 | Ledford et al. |
| 2018/0285836 A1 | 10/2018 | Enobakhare |
| 2018/0375877 A1* | 12/2018 | Jakobsson ............ G06F 16/955 |

* cited by examiner

RESOURCE INSTRUMENT FOR PROCESSING A REAL-TIME RESOURCE EVENT

FIELD OF THE INVENTION

The present invention is generally directed to real-time processing of resource events and, more specifically, a system that provides for a virtual or tokenized resource instrument for processing resource events.

BACKGROUND

A need exists to develop systems, apparatus, methods or the like for initiating real-time processing of a resource event. Currently, real-time processing of resource events is triggered by physical presentation of resources or a resource depository identifier. However, in today's digital world it would be advantageous, for the purposes of being able to conduct resource events across multiple different digital channels, to be able to initiate real-time processing of a resource event by other means. In addition, such systems, apparatus, methods or the like should provide a means for verifying the identity of the user of the alternate means and, thus, authorizing the user to proceed with initiating the real-time processing of the resource event.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, methods and/or the like for a virtual and/or tokenized resource instrument used for initiating the processing of a resource event. The resource instrument includes one or more unique coded identifiers that, upon decoding, identify the user conducting the resource event, as well as, provide the means for accessing the real-time processing network that is used to process, in real-time, the resource event. In addition, the resource instrument provides a means for verifying the identity of the user and, thus, authorizing the user to proceed with real-time processing of the resource event via the real-time processing network. In further embodiments of the invention, the coded identifier(s) are configured, upon decoding, to identify one or more resource depositories associated with the user that are configured to provide the requisite resources for the resource event. In such embodiments of the invention, presentation of the resource instrument prompts decoding of the coded identifier(s) which results in a verification that the one or more resource depositories currently store a volume of resources equal to or greater than a volume required to process the resource event.

As such, the resource instrument of the present invention provides for real-time processing of resource events to be initiated from various different and previously unused event channels. In addition, the resource instrument of the present invention provides a highly secure and effective means of identifying the entity using the resource instrument and, thus, authorizing the user to proceed with the processing of the resource event.

A system for initiating processing of a resource event defines first embodiments of the invention. The system includes a resource event instrument comprising at least one coded identifier that is configured to, upon decoding, identify a user and provide access to a real-time processing network. The system additionally includes a computing platform including a memory and at least one processor in communication with the memory. The memory stores instructions that are executable by the at least one first processor. The instructions are configured to receive a resource event request that comprises the at least one coded identifier, a resource volume associated with a resource event requested by the user and a resource recipient. The instructions are further configured to decode the at least one coded identifier to identify the user and provide access to the real-time processing network, and authorize the user to process the resource event via the real-time processing network. The instructions are further configured to, in response to authorizing the user, access the real-time processing network and initiate communication of a real-time processing command to the real-time processing network that authorizes the real-time processing of the resource event.

In specific embodiments of the system, in response to communicating the real-time processing command to the real-time processing network (i) the resource event is irrevocable by the user, and (ii) the resource event is cleared in real-time.

In other specific embodiments of the system, the at least one coded identifier of the resource event instrument is further configured to, upon decoding, identify a user-specific resource depository associated with the user. In such embodiments of the system, the instructions are further configured to verify that the user-specific resource depository currently stores resources equal to or greater than the resource volume, and, in response to authorizing the user and verifying that the user-specific resource depository currently stores resources equal to or greater than the resource volume, communicate the resource event command to the real-time processing network.

In other embodiments of the invention, the at least one coded identifier of the resource event instrument is further configured to, upon decoding, identify processing instructions for the resource event. In such embodiments of the system the processing instructions for the resource event may include at least one selected from a group comprising (i) resource event routing instructions and (ii) resource clearing instructions. In related embodiments of the system, the instructions are further configured to decode the at least one identifier to identify the processing instructions for the resource event, and communicate the real-time processing command to the real-time processing network that indicates the processing instructions.

In still further specific embodiments of the system, the resource event instrument is one selected from a group comprising (i) a token, (ii) a virtual resource event card, and (iii) a physical resource event card.

In other specific embodiments of the system, the instructions are further to authorize the user by at least one selected from a group comprising (i) comparing user-inputted user credentials to stored user credentials, (ii) comparing user-inputted personal data to stored personal data, and (iii) conducting multi-factor user authentication.

An apparatus for initiating processing of a resource event defines second embodiments of the invention. The apparatus comprises a computing platform including a memory and at least one processor in communication with the memory. The memory stores instructions that are executable by the at least one first processor. The instructions are configured to receive a resource event request that comprises at least one coded identifier, a resource volume associated with a resource event requested by a user and a resource recipient. The instructions are further configured to decode the at least one coded identifier to identify the user and provide access to a real-time processing network. In addition the instructions are configured to authorize the user to process the resource event via the real-time processing network, and, in response to authorizing the user, access the real-time processing network and initiate communication of a real-time processing command to the real-time processing network that authorizes the real-time processing of the resource event.

In specific embodiments of the apparatus, the instructions are further configured to decode the at least one coded identifier to identify a user-specific resource depository associated with the user. In such embodiments of the apparatus, the instructions are further configured to verify that the user-specific resource depository currently stores resources equal to or greater than the resource volume, and, in response to authorizing the user and verifying that the user-specific resource depository currently stores resources equal to or greater than the resource volume, communicate the resource event command to the real-time processing network.

In further specific embodiments of the apparatus, the instructions are further configured to decode the at least one coded identifier to identify processing instructions for the resource event. In such embodiments of the apparatus, the instructions are further configured to communicate the real-time processing command to the real-time processing network that indicates the processing instructions.

In still further embodiments of the apparatus, the instructions are further to authorize the user by at least one selected from a group comprising (i) comparing user-inputted user credentials to stored user credentials, (ii) comparing user-inputted personal data to stored personal data, and (iii) conducting multi-factor user authentication.

A computer-implemented method for closed loop resource event processing defines third embodiments of the invention. The computer-implemented method is implemented by one or more processing device. The method includes receiving a resource event request that comprises at least one coded identifier, a resource volume associated with a resource event requested by a user and a resource recipient. The method further include decoding the at least one coded identifier to identify a user and provide access to a real-time processing network. In addition, the method includes authorizing the user to process the resource event via the real-time processing network. Moreover, the method includes, in response to authorizing the user, accessing the real-time processing network and communicating a real-time processing command to the real-time processing network that authorizes the real-time processing of the resource event.

In specific embodiments of the method the step of decoding further includes decoding the at least one coded identifier to identify a user-specific resource depository associated with the user. In such embodiments the method may further include verifying that the user-specific resource depository currently stores resources equal to or greater than the resource volume and communicating the real-time event command may further include, in response to authorizing the user and verifying that the user-specific resource depository currently stores resources equal to or greater than the resource volume, communicating the resource event command to the real-time processing network.

In further embodiments of the method, decoding further includes decoding the at least one coded identifier to identify processing instructions for the resource event. In such embodiments of the method, communicating may further include communicating the real-time processing command to the real-time processing network that indicates the processing instructions.

Thus, according to embodiments of the invention, which will be discussed in greater detail below, the present invention provides for a virtual and/or tokenized resource instrument that is used for initiating the processing of a resource event. The resource instrument includes one or more unique coded identifiers that, upon decoding, identify the user conducting the resource event, as well as, provide the means for accessing the real-time processing network that is used to process, in real-time, the resource event. In addition, the resource instrument provides a means for verifying the identity of the user and, thus, authorizing the user to proceed with real-time processing of the resource event via the real-time processing network.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
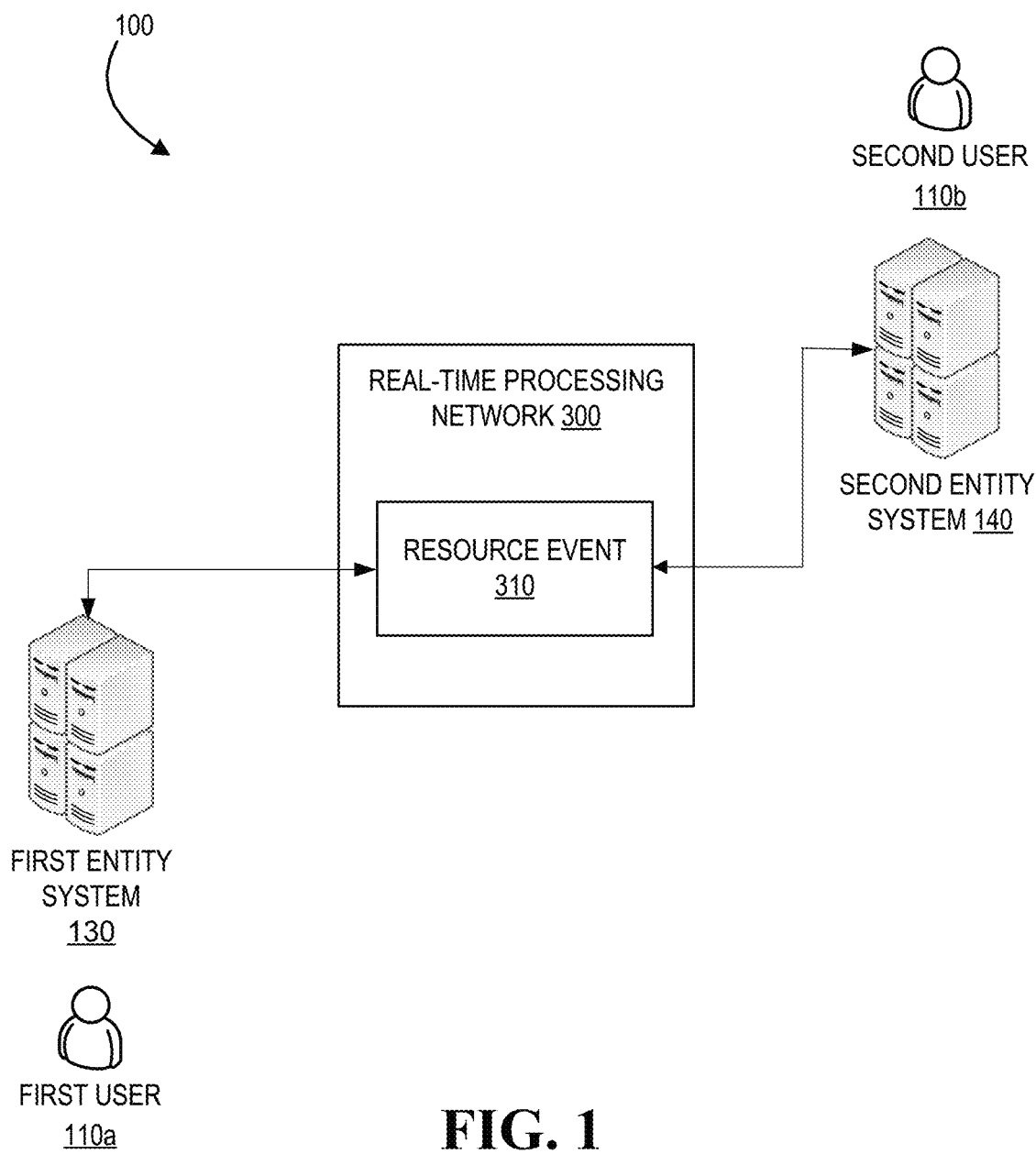
Figure 2:
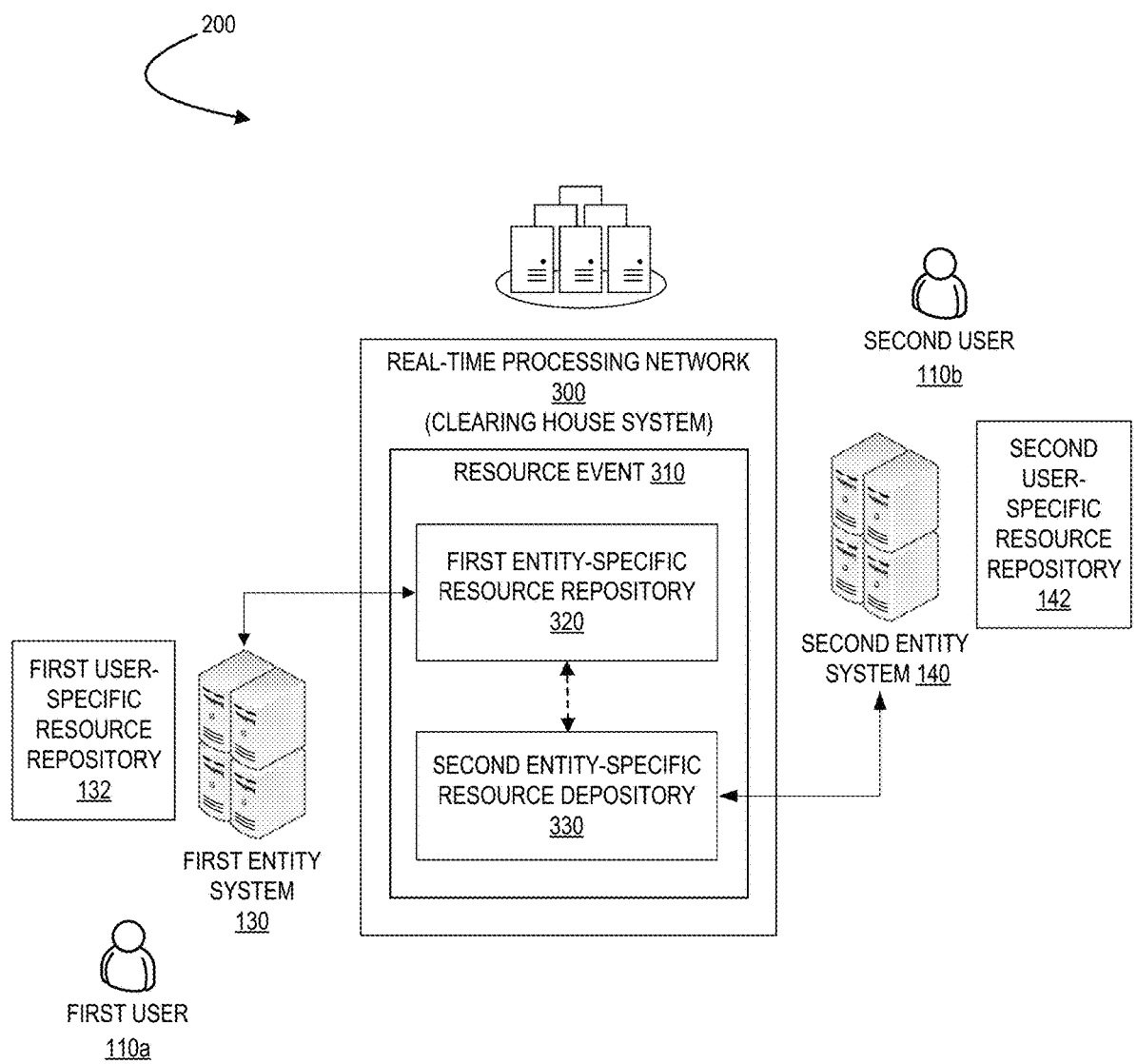
Figure 3:
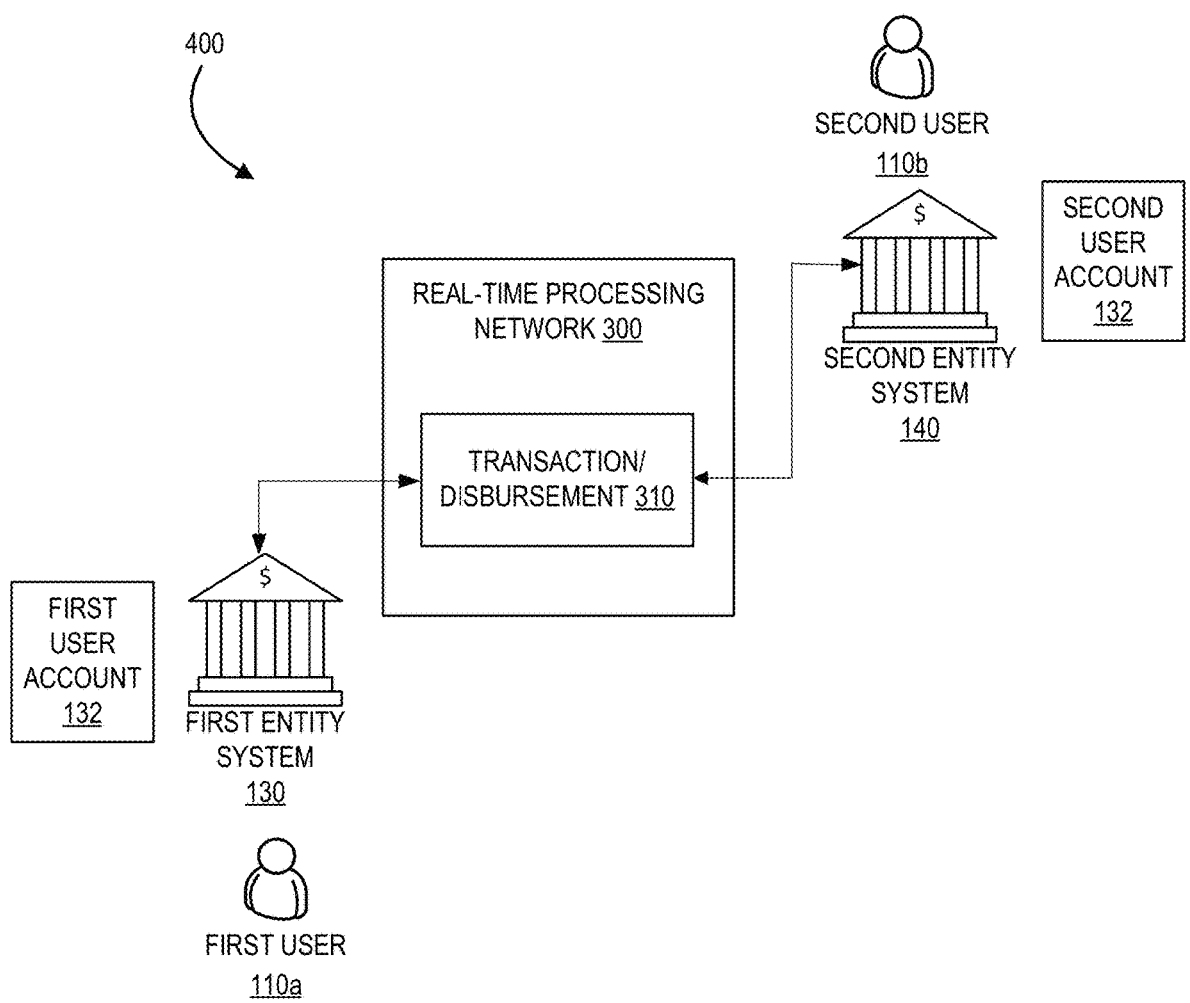
Figure 4:
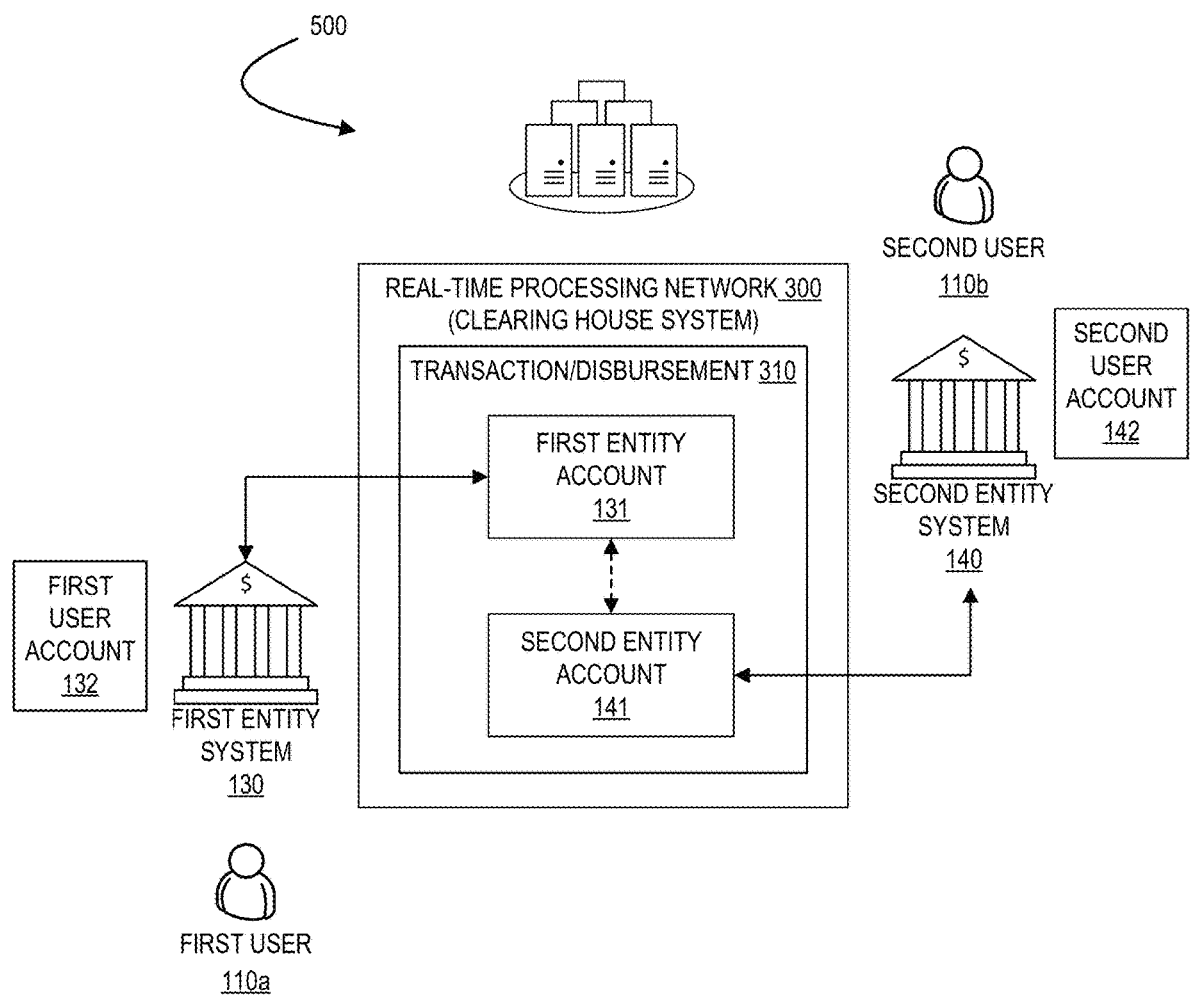
Figure 5:
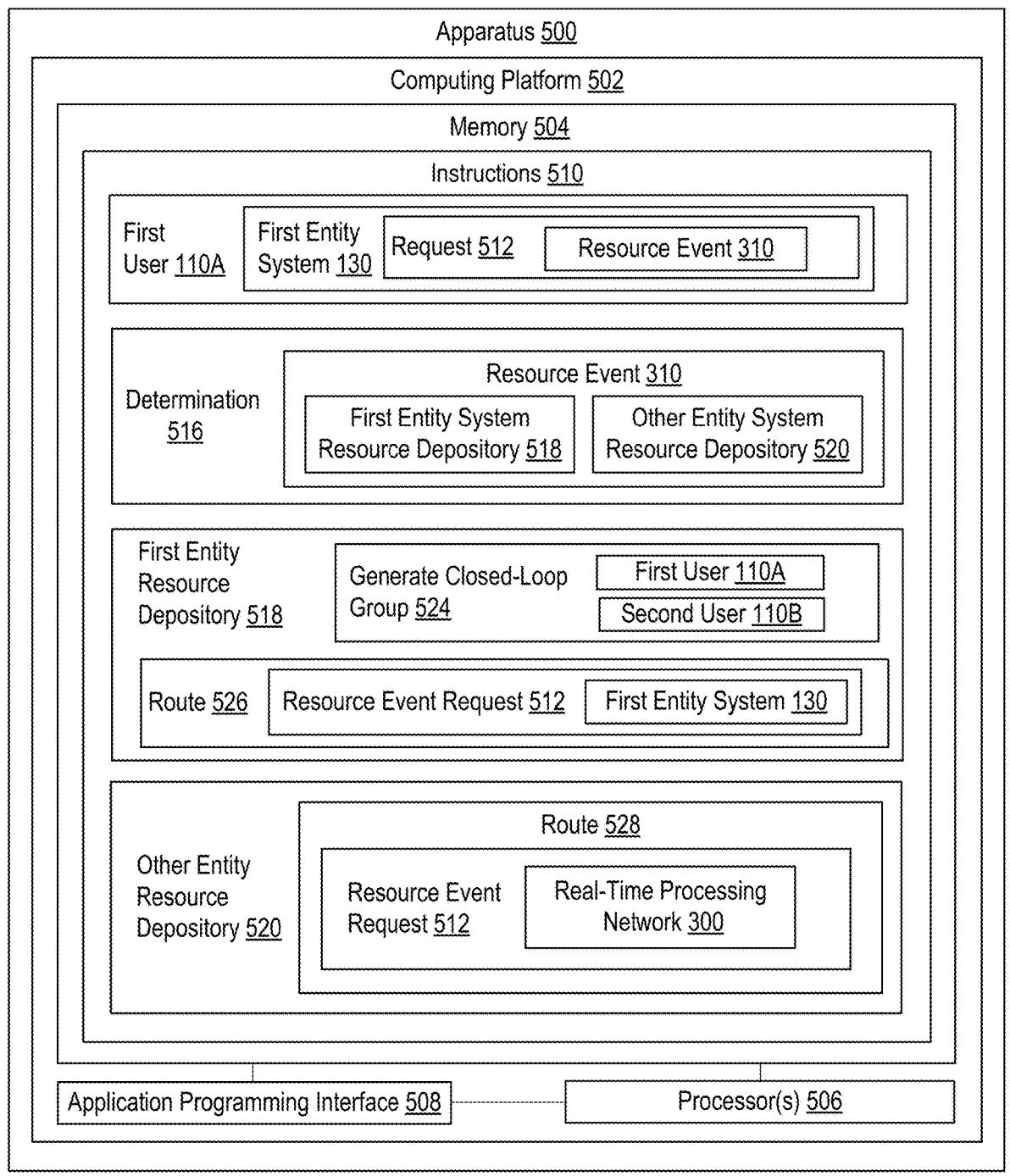
Figure 6:
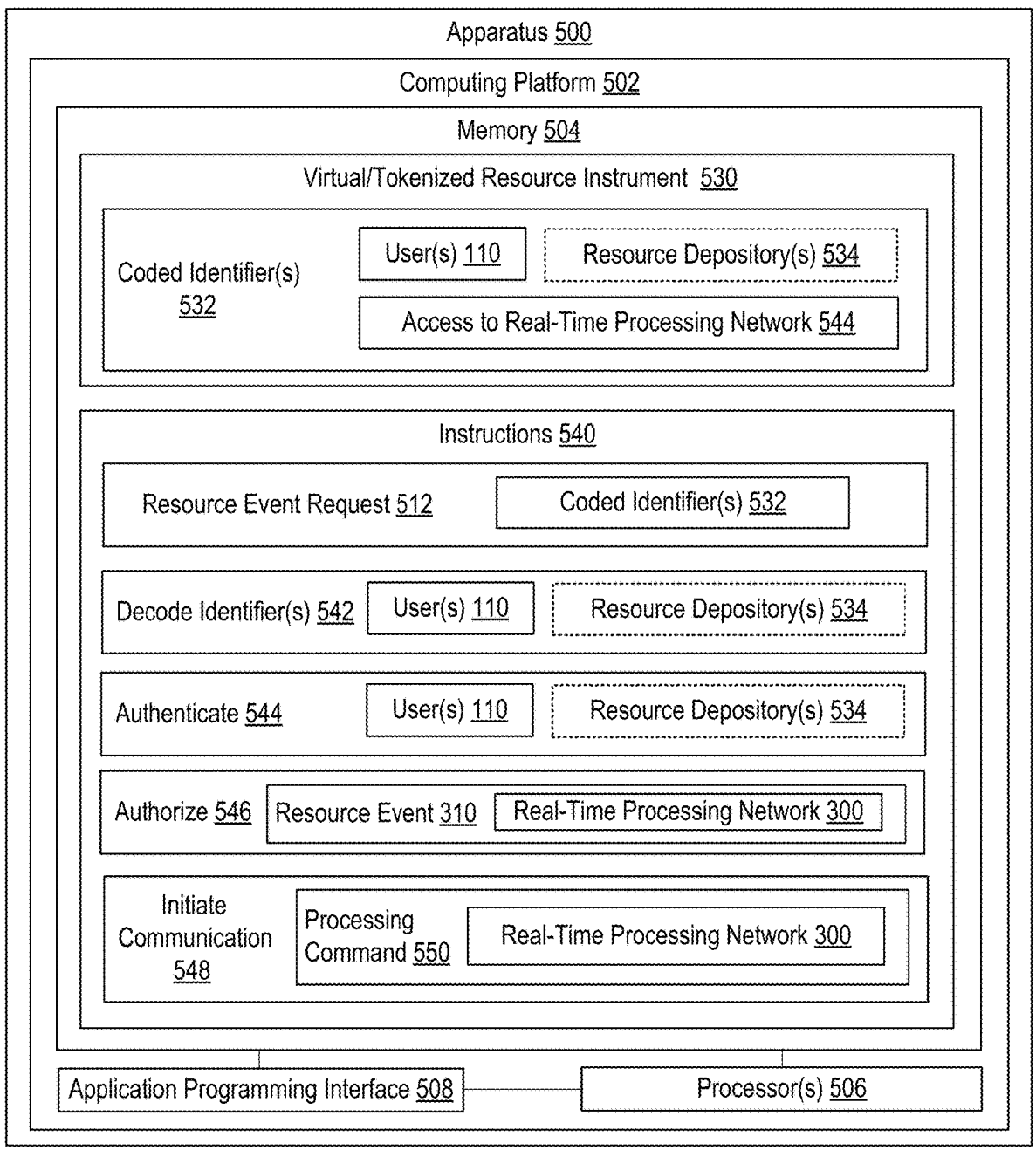
Figure 7:
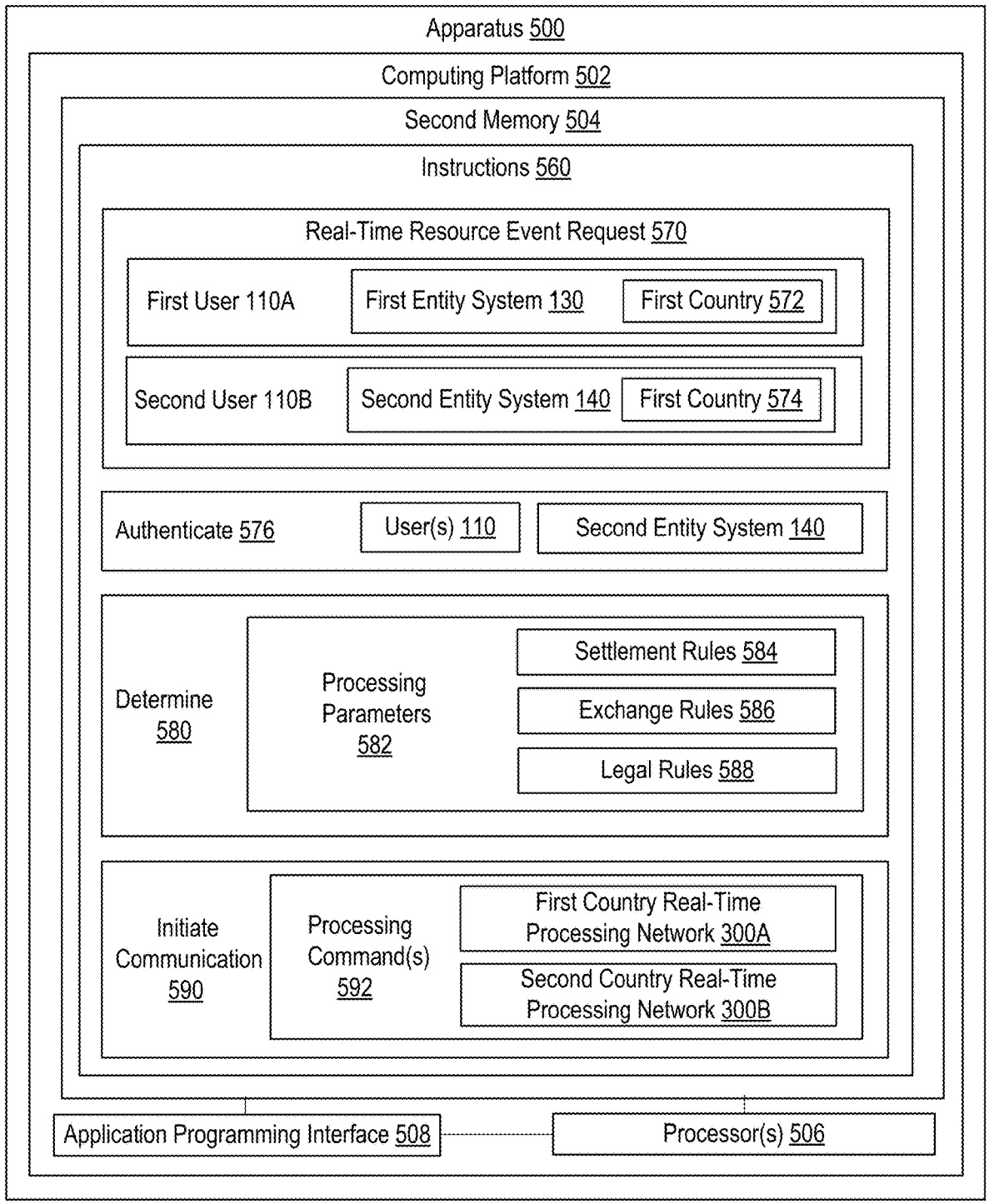
Figure 8:
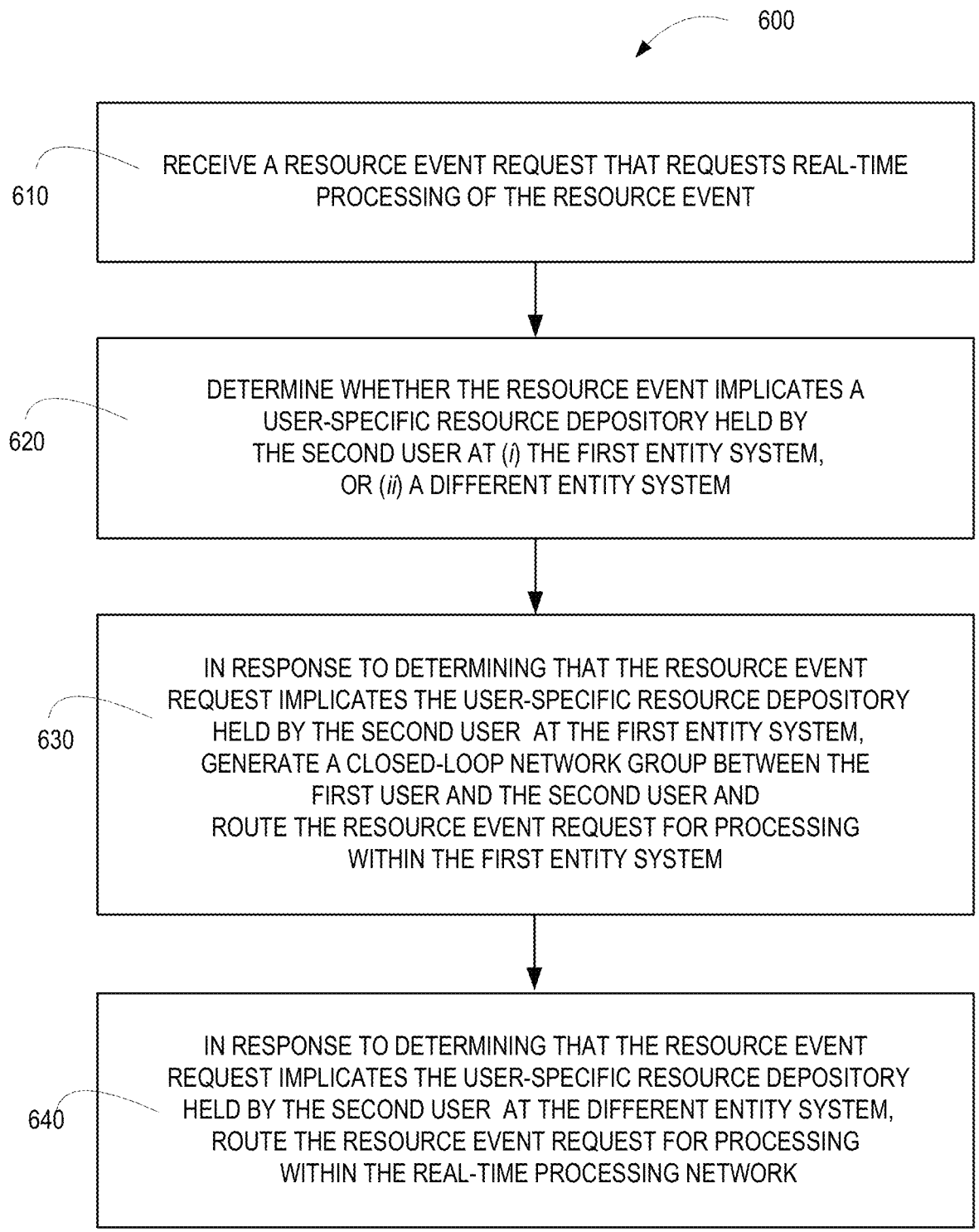
Figure 9:
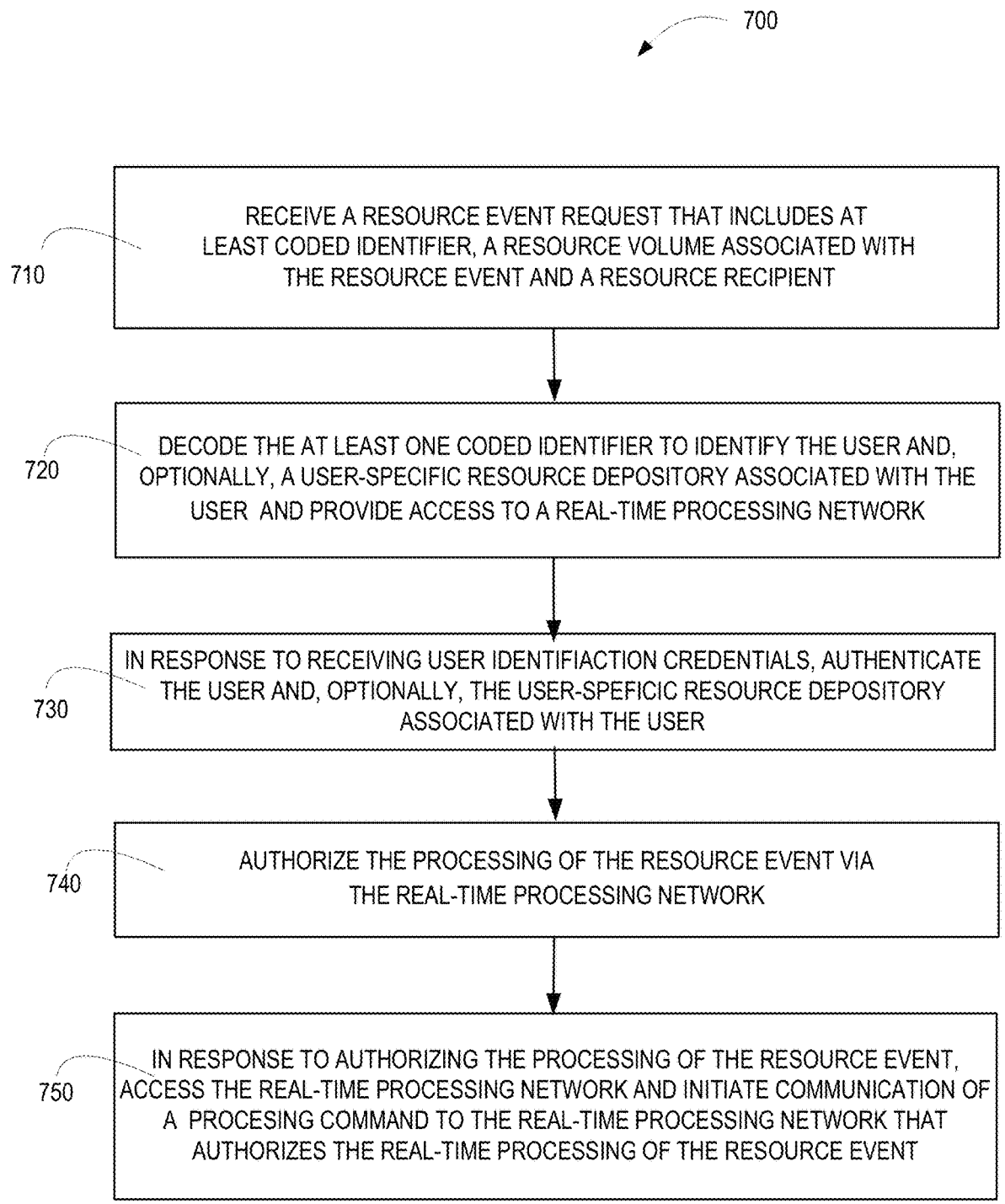
Figure 10:
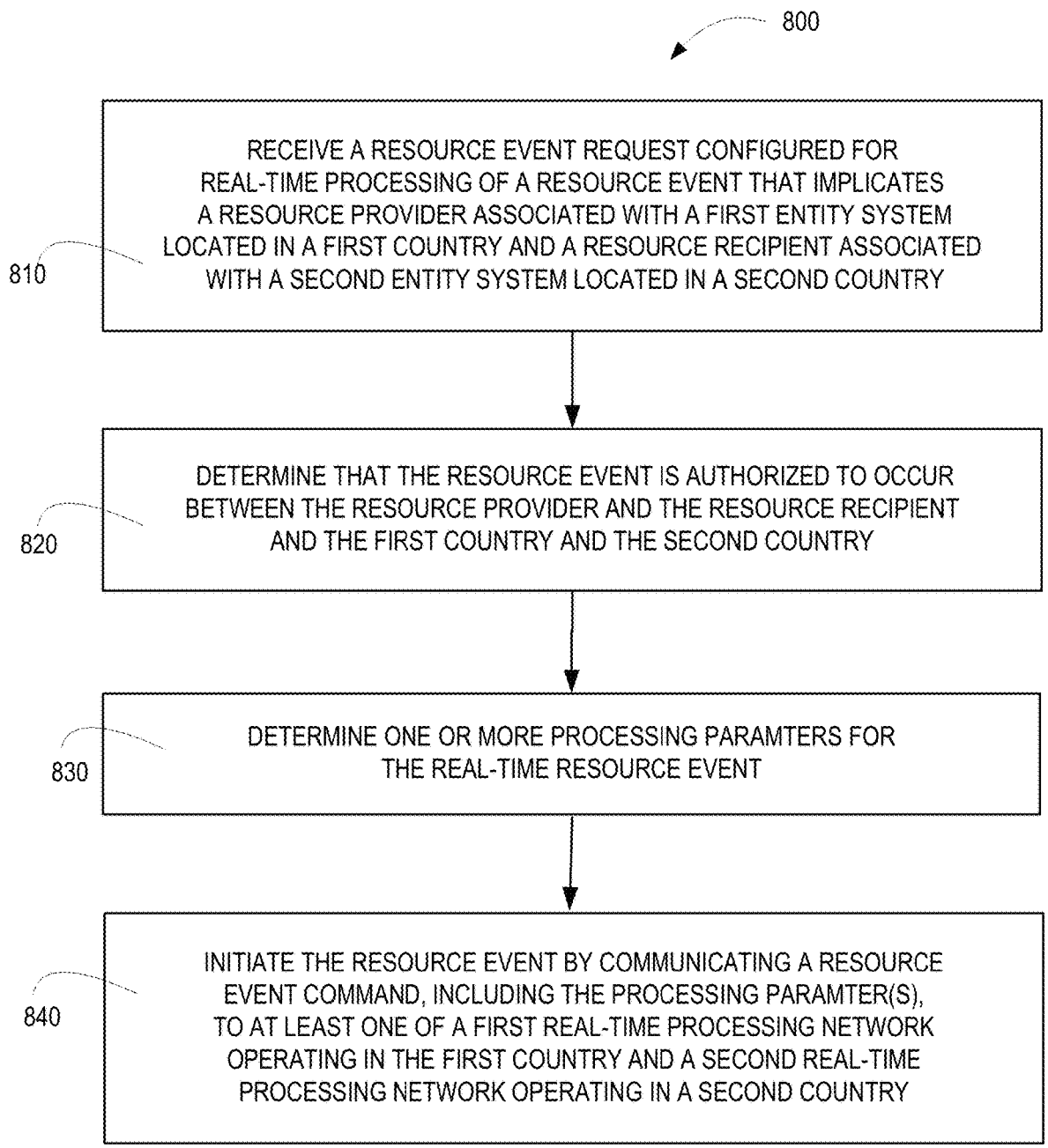
Figure 11:
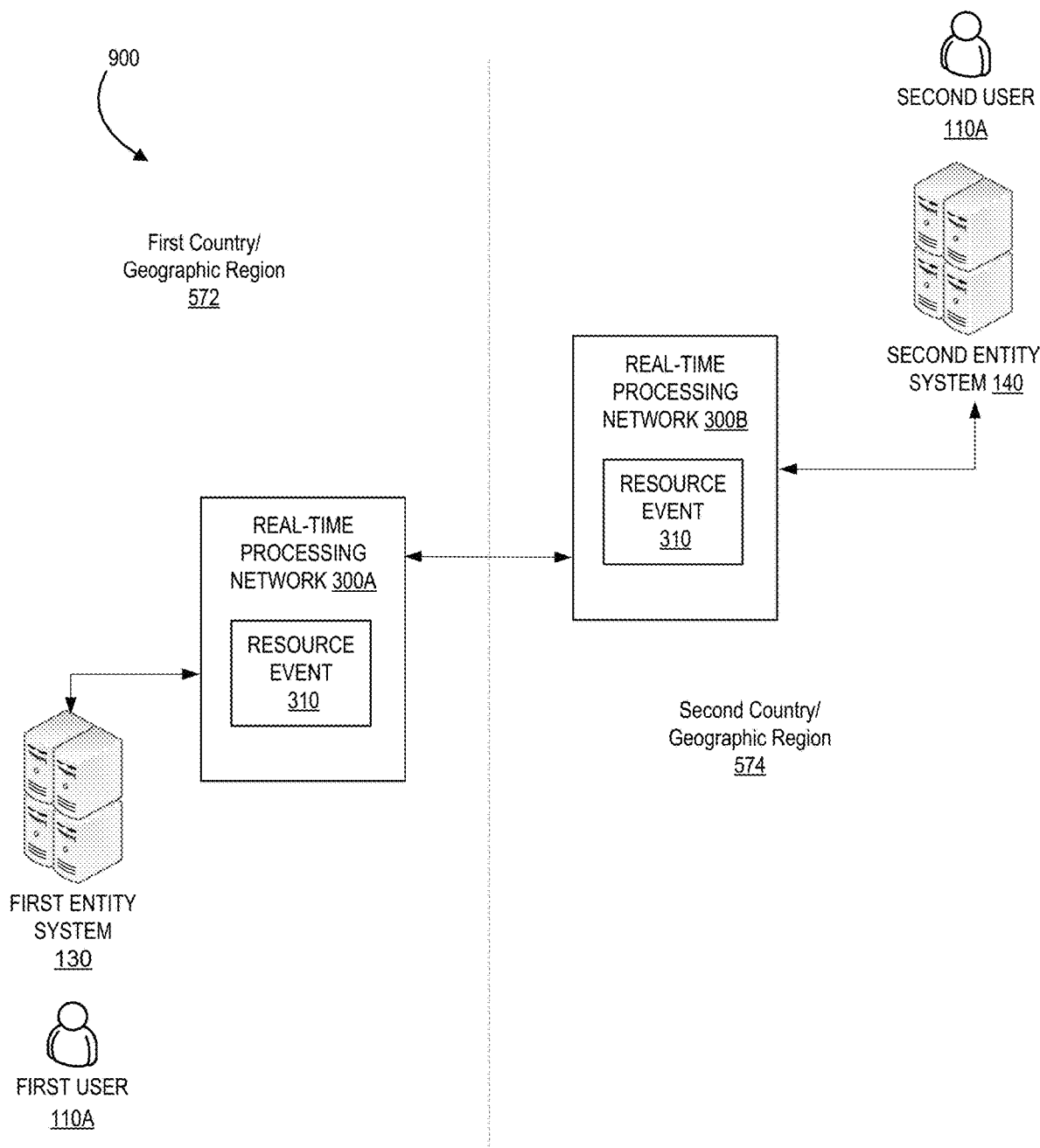

Having thus described embodiments of the disclosure in general terms, reference will now be made to the accompanying drawings, wherein:

FIG. 1 is a schematic diagram of a system for processing resource events in a real-time processing network, in accordance with some embodiments of the present disclosure;

FIG. 2 is a schematic diagram of a system for processing resources event in a real-time processing network using a clearing house system, in accordance with embodiments of the present invention;

FIG. 3 is a schematic diagram of a system for processing financial transactions/disbursements in a real-time processing network, in accordance with embodiments of the present invention;

FIG. 4 is a schematic diagram of a system for processing financial transactions/disbursements in a real-time processing network using a clearing house system, in accordance with embodiments of the present invention;

FIG. 5 is a block diagram of an apparatus for closed-loop real-time resource event processing, in accordance with some embodiments of the present disclosure;

FIG. 6 is a block diagram of an apparatus configured for implementing a resource instrument for conducting a resource event via a real-time processing network;

FIG. 7 is a block diagram of an apparatus configured for initiating and processing resource events across international real-time processing networks, in accordance with embodiments of the present invention;

FIG. 8 is a flow diagram of a method for closed-loop real-time resource event processing, in accordance with embodiments of the present invention;

FIG. 9 is a flow diagram of a method for implementing a resource instrument for conducting a resource event via a real-time processing network, in accordance with embodiments of the present invention;

FIG. 10 is a flow diagram of a method for initiating and processing a resource event across an international real-time processing network, in accordance with embodiments of the present invention; and FIG. 11 is a schematic diagram of a system for interconnected international real-time processing networks; in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, systems, apparatus, and methods are described in detail below for a virtual and/or tokenized resource instrument used for initiating the processing of a resource event. The resource instrument includes one or more unique coded identifiers that, upon decoding, identify the user conducting the resource event, as well as, provide the means for accessing the real-time processing network that is used to process, in real-time, the resource event. In addition, the resource instrument provides a means for verifying the identity of the user and, thus, authorizing the user to proceed with real-time processing of the resource event via the real-time processing network. In further embodiments of the invention, the coded identifier(s) are configured, upon decoding, to identify one or more resource depositories associated with the user that are configured to provide the requisite resources for the resource event. In such embodiments of the invention, presentation of the resource instrument prompts decoding of the coded identifier(s) which results in a verification that the one or more resource depositories currently store a volume of resources equal to or greater than a volume required to process the resource event.

In specific embodiments of the invention, the resource event is a financial transaction/disbursement. In such embodiments of the invention, the resource instrument is a tokenized and/or virtual funding instrument having one or more unique coded identifiers that, upon, decoding identify the user/transactor and provides for accessing a real-time processing network for conducting the financial transaction/disbursement in real time (i.e., the financial transaction is settled in real-time; meaning the funds associated with the transaction/disbursement are available to the other transaction party immediately upon conducting the financial transaction/disbursement). The funding instrument is also configured to provide for user/transaction identity verification and, thus authorization to conduct the financial transaction/disbursement via the real-time payment network. Moreover, in additional embodiments the coded identifiers of the funding instrument provide for identification of one or more user accounts for funding the financial transaction/disbursement and the presentation of the funding instrument for purposes of conducting a real-time financial transaction/disbursement provides for verifying that the one or more user accounts currently have resources available to fund the financial transaction/disbursement.

Thus, the present invention provides for real-time processing of financial transactions to be initiated from various different and previously unused channels, such as online and the like. In addition, the funding instrument of the present invention provides a highly secure and effective means of identifying the user using the funding instrument and, thus, authorizing the user to proceed with the processing of the real-time financial transaction/disbursement.

FIG. 1 illustrates a block diagram of a high-level real-time processing system 100, in accordance with embodiments of the present invention. In the illustrated system 100, a first user 110A is associated with a first entity system 130 and a second user 110B is associated with a second entity system 140. A real-time processing network 300 is configured to process, in real-time, a resource event 310, in which first user 100a is the resource provider and second user 100b is the resource recipient. In specific embodiments of the invention, real-time processing provides for the resources to be available to the resource recipient immediately (i.e., once the real-time processing network 300 has completed processing the resource event 310). In other embodiments of the invention, real-time processing provides for the resource event 310 to be cleared/settled upon completion of processing by the real-time processing network 300. In specific embodiments of the invention, the real-time processing nature means that once the first user 100a initiates the resource event 310, the resource event is deemed irrevocable (i.e., the resource event cannot cancelled or otherwise prevented from completion).

In specific embodiments of the invention, the first user 110A and the second user 110B are users of the real-time processing system 100, such that, the first user 110A initiates a resource event in which the second user 110B is the resource recipient. In specific embodiments of the invention, the first user 110A initiates the resource event from the first entity system 130 by providing requisite authentication information, which serves to authenticate the identity of the first user 110A. In specific embodiments of the invention, authentication of an identity may include multi-factor/multi-step authentication (i.e., involving one or more computing devices) as required by information security standards and requirements. The first user 100A may also provide, as part of the authentication information, a resource depository identifier, which serves to identify a source for resources associated with the resource event 310. In such embodiments of the invention, first entity system 130 may authenticate the validity of the resource depository and validate that the resource depository currently stores a sufficient volume of resources to process the resource event 310.

In specific embodiments of the invention, once the first user 100A initiates the resource event 310, the second user 110B, as the resource recipient, receives communication, via the second entity system 140 to accept the resources (i.e., accept the resource event) following performance of requisite user authentication requirements. Communication between first user 100A and second user 100B related to the resource event is transmitted between the first and second entity systems 130 and 140 via the real-time processing network 300. The real-time processing network 300 is configured to directs the resources to the appropriate entity system associated with resource recipient, in this instance second entity system 140 associated with the second user 100b.

It should be understood that while the illustrated embodiment of FIG. 1 depicts only first and second users 100A and 100B, and first and second entity systems 130 and 140, in actual embodiments of a real-time processing network 300 numerous entity systems having corresponding numerous users may interact with the real-time processing network 300 to process, as needed, resource events 310 in real-time.

In accordance with specific embodiments of the invention, the terms "entity system" may include any computing system comprising one or more computing devices (e.g., servers, storage devices, personal computers (PCs) and the like) associated with entity/organization having a need to process resource events in real-time.

Furthermore, the term "user" may include a single individual or a group of individuals that desire to perform a resource event in real-time. The "user", as referenced herein, may refer to an individual or group of individuals that has the ability and/or authorization to access and use one or more resources or portions of a resource and request and initiate real-time processing via the real-time processing network 300. Moreover, the association between the users and the entity systems may be a one-time association for the purpose of processing the resource event in real-time or the association may be an ongoing association in which the users regularly process resource events, those in real-time and otherwise, with the associated entity system.

As used herein, the term "user computing device" or "mobile device" or "communication device" may refer to mobile phones, personal computing devices, tablet computers, wearable devices, smart devices and/or any portable electronic device capable of receiving (wirelessly or otherwise) and/or storing data therein. A "user interface" is any device or software that allows a user to input information, such as commands or data, into a device, or that allows the device to output information to the user. For example, the user interface may include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

A "system", as used herein, may refer to any information technology (IT) platform and may include a plurality of computing devices, such as servers, mainframes, personal computers, network devices (portable and otherwise), front and back end devices, database/storage devices and/or the like.

Referring to FIG. 2 a block diagram is depicted of a high-level real-time processing system 200, in accordance with one embodiment of the invention. In the illustrated embodiments, a first user 110A is associated with a first entity system 130 and a second user 110B is associated with a second entity system 140. The real-time processing network 300 is configured as a clearing house system in which the resource event 310 is conducted between a first entity-specific resource depository 320 and a second entity-specific resource depository 330. The first entity-specific resource depository 320 and the second entity-specific resource depository 330 are accessible by each respective entity system, i.e., first entity-specific resource depository 320 is accessible to first entity system 130 and second-entity-specific resource depository 330 is accessible to second entity system 140. The real-time processing network 300 acts as a trusted intermediary during completion (e.g., clearing/settlement) of the resource event 310. Resources are be transferred by each entity system 130 and 140 to and from their respective entity-specific resource depositories 320 and 330. Resource transfers between the first user-specific resource depository 132 and the second user-specific resource depository 142 are administered by the clearing house system 300 pending authentication and authorization of the users 110A and 100B and/or the user-specific resource depositories 132 and 142 as required by the resource event 310.

The clearing house system of the real-time processing network 300 is configured to direct the resources to the appropriate entity system associated with the second user 100B (i.e., resource recipient). The transfer of resources occurs between the first entity-specific resource depository 320 and second entity-specific resource depository 330 on behalf of their associated users 110A and 110B, wherein the resource event 310 may be cleared/settled at the entity systems immediately, concurrent with the completion of the resource event. As settlement occurs between the representative entity systems 130 and 140, resources are deleted from and added to the corresponding user-specific resource depositories 132 and 142. As a result of the resource event being is settled immediately, the resources are made available for use by the resource recipient (e.g., second user 100B) in real or near real-time.

In specific embodiments of the invention, the system 500 may further comprise more than one real-time processing network 300/clearing house system that receive and process resource event requests as described herein.

Referring to FIG. 3 a block diagram is shown of a high-level real-time processing system 400, in accordance with embodiments of the present invention. In the illustrated system 100, a first user 110A is associated with a first entity system 130, such as a customer of a first financial institution and a second user 110B is associated with a second entity system 140, such as a customer of a second financial institution. In this regard the real-time processing network 300 otherwise referred to as a real-time payment (RTP) network is configured to process, in real-time, a resource event in the form of a transaction/disbursement 310 of funds, in which first user 100a provides the funds and second user 100b receives the funds. In specific embodiments of the invention, real-time payment provides for the funds to be available to the recipient (i.e., second user/customer 100B) immediately (i.e., once the real-time payment network 300 has completed processing the transaction/disbursement 310). In other embodiments of the invention, real-time payment provides for the transaction/disbursement 310 to be cleared/settled upon completion of processing by the RTP network 300. In specific embodiments of the invention, the real-time aspect of RTP network 300 means that once the first user 100A initiates the transaction/disbursement 310, the transaction/disbursement 310 is deemed irrevocable (i.e., the transaction/disbursement cannot be cancelled, interrupted or otherwise prevented from completion/settlement) and the first user 100A bares an obligation to remit the funds to the second user 100B.

In specific embodiments of the invention, the RTP network 300 is configured to communicate in accordance with an industry-wide standard messaging protocol. For example, in specific embodiments of the invention, the messaging protocol may adhere to International Organization for Standardization (ISO) standard 20022, which detects the format and rules for communicating messages/commands between the entity systems 130 and 140 and the RTP network 300. In specific embodiments of the invention, the transaction/disbursement 310 may occur, in its entirety, via a series of messages communicated between the entities 130 and 140 via the RTP network 300. While in other embodiments of the invention, such as those, discussed in relation to FIG. 4, infra., the RTP network 300 will implement a clearing house system.

In specific embodiment of the invention, the first user 110A and the second user 110B are predetermined users (i.e., registered users) of the real-time processing system 400, wherein the first user 110A (i.e., the payor) initiates a credit transfer to the second user 110B (i.e., the payee). In specific embodiments of the invention, the first user 110A is required to initiate the transfer from the first entity system 130 in response to the first user 110a providing authentication information to authenticate the identity of the first user 110A and validity of the first user account 132 held at the first entity system 130. The authentication information may include account numbers, routing numbers, PIN numbers, username and password, date of birth, social security number, or the like, or other authentication information as described herein. As previously described, in some embodiments of the invention, user identity authentication may comprise multi-factor/multi-step authentication as prescribed by information security standards and requirements. In addition, the system 400 may provide for authorizing the transaction/disbursement 310 based on verifying the first user account 132 held at the first entity system 130 currently stores at least a sufficient amount of available funds to fulfill the transfer/disbursement 310. While in certain embodiments of the invention, the first user 110a initiates the transfer from a physical, brick-and-mortar location of the first entity system 130, in alternative embodiments described herein, the transfer may be initiated from other locations in which the user is not required to be at a brick-and-mortar location (e.g., via an electronic application, a website, a point-of-sale (POS) device or the like).

Upon the first user 100A initiating transaction/disbursement 310, the second user 110B, as the payee, receives a communication to accept payment in response to the second user providing requisite authentication information and the system 400 verifying the identity of the second user and the validity of the second user account 142. As previously discussed, communication related to the transaction/disbursement 310 between first and second user 100A is transmitted between the first and second entity systems 13 and 140 via the real-time processing network 300 which directs the payment to the appropriate entity (e.g., second entity system 140) associated with the payment recipient (i.e., second user 100B). As settlement occurs between the representative first and second entity systems 130 and 140, debiting and crediting of individual user accounts (i.e., first and second user accounts 132 and 142) may be managed at each entity system. As the transaction/disbursement is settled immediately, funds may be made available for use by the recipient (i.e., second user 100B) in real or near real-time.

The entity systems 130 and 140 may be associated with financial institutions or any other entity/organization that processes financial transactions/disbursements or the like. Additionally, it should be appreciated by someone with ordinary skill in the art that the user may be an existing customer of the financial institution or a potential customer of the financial institution or the like.

Referring to FIG. 4 a block diagram is depicted of a high-level real-time processing system 500, in accordance with one embodiment of the invention. In the illustrated embodiments, a first user 110A is associated with a first entity system 130, such as a customer of a first financial institution and a second user 110B is associated with a second entity system 140, such as a customer of a second financial institution. The real-time processing network 300 is a real-time payment (RTP) network configured as a clearing house system in which the transaction/disbursement 310 is conducted between a first entity-specific account 330 and a second entity-specific account 340. The first entity-specific account 330 and the second entity-specific account 340 are accessible by each respective entity system, i.e., first entity-specific account 330 is accessible to first entity/financial institution system 130 and second entity-specific account 340 is accessible to second entity/financial institution system 140. The RTP network 300 acts as a trusted intermediary during settlement of the transaction/disbursement 310. Funds are be transferred by each entity system 130 and 140 to and from their respective entity-specific accounts 330 and 340. Fund transfers between the first user account 132 and the second user account 142 are administered by the clearing house system 300 pending authentication and authorization of the users 110A and 100B and/or the user accounts 132 and 142 as required by the transaction/disbursement 310.

The clearing house system of the RTP network 300 is configured to direct the funds to the appropriate entity system/financial institution associated with the second user 100B (i.e., payee). The transfer of funds occurs between the first entity account 330 and second entity account 340 on behalf of their associated users 110A and 110B. As such, the transaction/disbursement 310 may be cleared/settled at the entity systems/financial institutions immediately, concurrent with the completion of the transaction/disbursement. As settlement occurs between the representative entity systems/financial institutions 130 and 140, funds are debited and credited to the corresponding user accounts 132 and 142. As a result of the transaction/disbursement being is settled immediately, the funds are made available for use by the payee (e.g., second user 100B) in real or near real-time.

In specific embodiments of the invention, the system 300 may further comprise more than one RTP network 300/clearing house system that receive and process transaction/disbursement requests as described herein.

Referring to FIG. 5 a block diagram is presented of apparatus 500 configured for closed-loop real-time resource event processing, in accordance with embodiments of the invention. Apparatus 500 may comprise one or more server devices or the apparatus may comprise one of the one or more other computing devices (e.g., mainframes, storage devices, personal computers (PCs) or the like) capable of executing computer-readable instructions. The Apparatus 500 includes a computing platform 502 that can execute instructions, such as algorithms, modules, routines, applications and the like. Computing platform 502 includes memory 504, which may comprise volatile and non-volatile memory, such as read-only and/or random-access memory (RAM and ROM), EPROM, EEPROM, flash cards, or any memory common to computer platforms). Moreover, memory 504 may comprise cloud storage, such as provided by a cloud storage service and/or a cloud connection service.

Further, computing platform 502 also includes processor 506, which may be an application-specific integrated circuit ("ASIC"), or other chipset, logic circuit, or other data processing device. Processor 506 may execute an application programming interface ("API") 508 that interfaces with any resident instructions, such as instructions 510 and sub-instructions associated therewith or the like stored in the memory 504 of the computing apparatus 500.

Processor 506 may include various processing subsystems (not shown in FIG. 5) embodied in hardware, firmware, software, and combinations thereof, that enable the functionality of computing apparatus 500 and the operability of the communication apparatus 500 on a distributed computing network. For example, processing subsystems allow for initiating and maintaining communications and exchanging data with other networked devices. For the disclosed aspects, processing subsystems of processor 506 may include any subsystem used in conjunction with instructions 510 and related sub-instructions, sub-routines, algorithms, sub-algorithms, modules, sub-modules thereof.

Computer platform 502 may additionally include a communications module (not shown in FIG. 5) embodied in hardware, firmware, software, and combinations thereof, that enables electronic communications between the computing apparatus 500 and other networks, such as real-time processing network 300 (shown in FIGS. 1-4) and devices. Thus, communication module may include the requisite hardware, firmware, software and/or combinations thereof for establishing and maintaining a network communication connection.

Further, the memory 504 of apparatus 500 stores instructions 510 that are executable by processor 506. The instructions 510 are configured to receive, from a first user (i.e., resource provider) 110A associated with a first entity system 130, a resource event request 512 that requests processing of a resource event 310 in real-time. In response to receiving the request 512 a determination 516 is made as to whether the resource event 310 implicates a user-specific resource depository 518, 520 held by a second user (i.e., resource recipient) (i) the first entity system, or (ii) an entity system other than the first entity system. In those embodiments, in which the resource event 310 is a transaction/disbursement, the determination 518 is to whether the payor's designated payment account is held at the same financial institution that receives the request (i.e., the payee's financial institution) or the account is held at another financial institution.

In response to determining that the resource event 310 implicates a user-specific resource depository 518 held by the second user at the first entity system, a closed-loop network group 524 is generated between the first user 100A and the second user 100B and the request 512 is routed 526 for processing within the first entity system 130. It should be noted that the first entity system 130 is configured to process the request 512 in real-time. In specific embodiments, the first entity system 130 includes an internal real-time processing network that is configured to perform real-time processing in a same or similar manner than the external real-time processing network 300. Thus, in specific embodiments of the invention, the internal real-time processing network of the first entity system 300 will employ the same structure/messaging protocol as used within the real-time processing network 300. In those embodiments of the invention, in which the resource event 310 is a transaction/disbursement, in response to determining that the payor's designated payment account is held at the payee's financial institution, the payment request is routed for internal processing within the first financial institution's internal real-time payment system/network. In such embodiments, the internal real-time payment system/network may implement the same structure/messaging protocol (e.g., ISO 20022) as used in the RTP network 300. Same structuring/messaging protocol allow for both internally processed real-time payments and externally processed real-time payments to be stored and subsequently analyzed together.

In response to determining that the resource event 310 implicated a user-specific resource depository 520 held by the second user at another entity system other than the first system, the request 512 is routed 528 for processing within the real-time processing network 300. In those embodiments of the invention, in which the resource event 310 is a transaction/disbursement, in response to determining that the payor's designated payment account is held at a financial institution other that the financial institution at which the payment request is received (e.g., the payee's financial institution), the payment request is routed for externally processing within the real-time payment network.

Referring to FIG. 6 a block diagram is presented of apparatus 500 configured for processing a resource event in real-time based on presentation of a virtual and/or tokenized resource instrument, in accordance with embodiments of the invention. The apparatus 500 is the same as the apparatus shown and described in relation to FIG. 4 except for the contents stored in memory 504 and, therefore, for the sake of brevity, only the contents stored in memory 504 will be described herein.

Memory 504, which may be memory associated with device possessed by a user 100 (e.g., mobile device including a mobile wallet) and/or the first entity system 130, stores virtual and/or tokenized resource instrument 530. The virtual and/or tokenized resource instrument 530 includes one or more coded identifiers 532. The coded identifiers may be encrypted to allow for secure wireless communication of the identifiers 532. The coded identifiers identify the user 110 and provides access 544 to a real-time process network 300. In specific embodiments of the invention, the coded identifier(s) may additional identify one or more resource depositories 534 configured for processing a resource event 310. Thus, in those embodiments in which the resource event 310 is a transaction/disbursement the resource instrument is a virtual and/or tokenized funding instrument that provides access to the real-time payment network for conducting the transaction/disbursement in real-time (i.e., funds become available to the payee in real-time to the transaction/disbursement and/or the transaction is settled/cleared at the payee's and payor's financial institutions in real-time).

Memory 504 of apparatus 500 additionally stores instructions 540 that are executable by the processor 506. The instructions 540 are configured to receive a resource event request 512 for processing a resource event 310 in real-time. The resource event request 512 including the coded identifier(s) 532 from the resource instrument 530. In addition the resource event request may include the resource volume associated with the resource event and a resource recipient resource depository identifier. In those embodiments in which the resource event 310 is a transaction/disbursement, the payment request may include the coded identifier(s) and, optionally the amount of the transaction/disbursement and an identifier (e.g., routing number or the like) for the payee's designated payment account.

In response to receiving the resource event request, the coded identifiers 532 are decoded 542 to identify the user 110 and, in specific embodiments, the user-specific resource depository 534 from which the resources are to be provided for processing the resource event 310. Decoding of the identifiers 532 may include decrypting the identifiers.

In response to decoding 542 the coded identifier(s) 532, the user 110 and, in some embodiments the resource depository 534 is authenticated 544. Authenticating 544 the user 110 may include receiving user identification credentials from the user (e.g., username and passcode, biometric data or the like) and comparing the received user identification credentials to stored and verified user identification credentials. In other embodiments of the invention, authenticating 544 the user 110 may include a multi-factor/multi-step authentication process or the like. Authenticating 544 the resource depository 534 may include verifying the existing and active state of the resource depository (i.e., the resource depository is not inactive, down, or otherwise on hold). In those embodiments in which the resource event 310 is a transaction/disbursement, authenticating the payment account may include verifying that the payment account exists and is active (i.e., not on hold, suspended or the like).

In addition, the resource event 310 is authorized 546 for processing on the real-time processing network 300. In specific embodiments of the invention, authorizing 546 the resource event 310 for processing on the real-time processing network 300 may include verifying that the resource depository includes the requisite resources to conduct the resource event and/or that the resource recipient's designated resource depository is configured to receive the volume of resources. In those embodiments of the invention in which the resource event 310 is a transaction/disbursement authorizing the transactions may include verifying that the payment account currently has the requisite amount of funds and/or verifying that the designated payee's account is configured to receive payment in the amount of the transaction/disbursement.

In response to authenticating 544 the user 110 and, in some embodiments, the resource depository 534 and authorizing 546 the resource event 310, the real-time processing network 300 is accessed and communication of a processing command 550 is initiated 548 to the real-time processing network 300 that authorizes the real-time processing of the resource event 310. In those embodiments of the invention, in which the resource event 310 is a transaction/disbursement, in response to authenticating the user and, optionally, the payment account and authorizing the transaction/disbursement, the real-time payment network is accessed and a processing command is sent to the network that authorizes the network to process the payment request in real-time.

Referring to FIG. 7 a block diagram is presented of apparatus 500 configured for initiating resource event processing across international real-time processing networks, in accordance with embodiments of the invention. The apparatus 500 is the same as the apparatus shown and described in relation to FIG. 4 except for the contents stored in memory 504 and, therefore, for the sake of brevity, only the contents stored in memory 504 will be described herein. The invention discussed in relation to FIG. 7 provides for a plurality of interconnected real-time processing networks, such that each of the real-time processing networks are associated with a different country or geographic region and are interconnected in a network-to-network configuration.

The memory 504 of apparatus 500 stores instructions 560 that are executable by the processor 506, The instructions are configured to receive a resource event request 570 that is configured to provide real-time processing for a resource event 310 that implicates a first user 100A associated with a first entity system 130 located in first country or geographic region and a second user 100B associated with a second entity system 140 located in a second country or geographic region different from the first country or geographic region. In specific embodiments of the invention, in which the resource event is transaction/disbursement, the funds are transferred from a user account in one country to a user account in a second country.

The instructions 570 are further configured to authenticate 576 the user 110 and the second entity system 140. The user is authenticated by receiving user identification credentials (i.e., username/passcode, biometric data) and comparing the credentials to known/stored user identification credentials. The second entity system 140 is authenticated by verifying that the country and/or second entity system are configured and authorized for an international resource event.

The instructions 570 are further configured to determine 580 processing parameters 582 for the resource event 310. In specific embodiment of the invention, the processing parameters 582 which may be dictated based on at least one of the first country 572 and the second country 574 may include, but are not limited to, settlement rules 584 that apply to the resource event, exchange rules 586 that apply to the resource event (e.g., exchange rate, where exchange should occur, when exchange should occur), and legal rules 588 that apply to the resource event. In those embodiments of the invention, in which the resource event 310 is a transaction/disbursement the processing parameters 582 may include any parameter related to the international real-time payment being processed. It should be noted that processing parameters 582 may be determined at the first entity system or at the second entity system depending on applicable rules governing the resource event.

The instructions 570 are further configured to initiate communication 590 of a processing command 592 to at least one of the first country's real time processing network 300A or the second country's real-time processing network 300B. In specific embodiments of the invention the processing command/message 592 is communicated to the first country's real time processing network 300A, which forwards the command to the second country's real-time processing network 300B for subsequent processing of the resource event within the second country's real-time processing network 300B. In addition, the processing command 592 may include the processing parameters 582. In those embodiments of the invention, in which the resource event 310 is a transaction/disbursement, the payment command can be communicated to either the first country's or second country's real-time payment network to authorize real-time payment processing.

Referring to FIG. 8 a flow diagram is depicted of a method 600 for closed-loop real-time event processing, in accordance with embodiments of the present invention. At Event 610, a resource event request is received that requests real-time processing of a resource event. The resource event is received at a first entity system that is associated with a first user that is providing resources for the resource event. In specific embodiments of the invention, a payment request is received that requests real-time payment for a transaction/disbursement.

At Event 620, a determination is made as to whether the resource event implicates a user-specific resource depository held by a second user at the first entity system or a user-specific resource depository held by a second user at another/different entity system other than the first entity system. In specific embodiments of the invention the determination may be made by reading or recognizing a resource depository identifier in the resource event request. In specific embodiments of the invention, a determination is made as to whether the payment is to be deposited into an account held at the financial institution processing the request (e.g., the payee's financial institution) or at an account held at a different financial institution.

If the determination is made that resource event implicates a user-specific resource depository held by the second user at the first entity system, at Event 630, a closed-loop network group is generated between the first user and the second user and the resource event request is routed for processing within the first entity system. In specific embodiments of the invention, the resource event request is routed to an internal real-time processing system that utilized the same messaging structuring as the external real-time processing network. In those embodiments in which the resource event is a transaction/disbursement, in response to determining that the payment is to be made to an account held by the financial institution handling the request (e.g., the payee's financial institution), the payment is routed and processed, in real-time, within the financial institution handling the request.

If the determination is made that resource event implicates a user-specific resource depository held by the second user at another/different entity system other than the first entity system, at Event 640, the resource event request is routed to the real-time processing network for subsequent real-time processing. In those embodiments in which the resource event is a transaction/disbursement, in response to determining that the payment is to be made to an account held at a financial institution other than the financial institution handling the request (e.g., the payee's financial institution), the payment request is routed to the external real-time payment network for subsequent real-time processing. In specific embodiments of the invention, in which the determination is made that resource event implicates a user-specific resource depository held by the second user at another/different entity system other than the first entity system, a directory look-up may be undertaken to determine if the second user holds an account at the first entity system and, if a determination is made that the second user holds an account at the first entity system, notifying at least one of the first and/or second users that the resource event may be structured such that the resources are received at the resource depository held by the second user at the first entity system.

Referring to FIG. 9 a flow diagram is depicted of a method 700 for processing a resource event in real-time based on presentation of a virtual and/or tokenized resource instrument, in accordance with embodiments of the invention. At Event 710, a resource event request is received that includes at least one coded identifier from a virtual and/or tokenized resource instrument and, optionally, a resource volume associated with the resource event and a user-specific resource depository associated with a second user (i.e., resource recipient). In those embodiments of the invention in which the resource event is transaction/disbursement the request may include the coded identifiers from a virtual/tokenized payment instrument, a payment amount and a payor's designated account for receiving the funds.

At Event 720, the one or more coded identifies are decoded to identify the first user and, in some embodiments, a user-specific resource depository configured to provide the resources and/or processing parameters, such as routing, settlement and the like. Decoding of the coded-identifiers also provides access to a real-time processing network. In those embodiments of the invention in which the resource event is a transaction/disbursement, decoding the identifiers identifies the payee and, in some embodiments, the payee's payment account and processing parameters, such as settlement and routing and provides access to the real-time payment network.

At Event 730, in response to receiving user identification credentials (e.g., username/passcode, biometric information and/or the like) the user is authenticated (i.e., the identity of the user is verified). Additionally, in specific embodiments of the method, the user-specific resource depository is authenticated by verifying the existence and/or active status of the resource depository. In those embodiments of the invention in which the resource event is a transaction/disbursement, the payee's payment account is authenticated by verifying that the account is active (i.e., not on hold, suspended or the like).

At Event 740, the resource event is authorized to be processed via the real-time processing network. In specific embodiments of the method, authorizing the resource event for processing includes verifying that the user-specific resource depository currently stores a volume of resources required to process the resource event and/or verifying the resource recipient's user-specific resource depository is configured to receive resources of the requisite volume. In those embodiments of the invention in which the resource event is a transaction/disbursement, authorizing the transaction/disbursement may include verifying that the payee's account currently has adequate funding for the transaction and/or verifying that the payor's account can accept funds in the amount of the transaction/disbursement.

At Event 750, in response to authorizing the resource event, the real-time processing network is accessed and a processing command is communicated to the real-time payment network that authorized the network to process the resource event. In specific embodiments of the invention, the processing commands may include the decoded processing parameters. In those embodiments of the invention in which the resource event is a transaction/disbursement, in response to authorizing the transaction/disbursement, a payment command is communicated to the real-time payment network that authorizes the network to provide payment in real-time.

Referring to FIG. 10 a flow diagram is shown of a method 800 for initiating resource event processing across interconnected international real-time networks, in accordance with embodiments of the present invention. At Event 810, a resource event request is received that is configured for real-time processing of a resource event. The resource event implicates a resource provider associated with a first entity system located in a first country and a resource recipient associated with a second entity system located in a second country. In those embodiments of the invention, in which the resource event is a transaction/disbursement, the payor is associated with a first financial institution in a first country and the payee is associated with a second financial institution (i.e., holds an account at a second financial institution at which payment is to be received) in a second country.

At Event 820, the user and the second entity system are authorized for conducting the resource event. Authorization of the user may not only include verifying the identity of the user but also determining that the user meets guidelines pertaining to the number of resource events conducted internationally or with the second country over a period of time, the volume of resources associated with resource events over a predetermined period of time and the like. Moreover, in specific embodiments risk level of the user is determined and a determination is made that the risk level fails below a predetermined level associated with at least one of the first country, the second country, and the second entity system. Authorization of the resource event may include verifying that the second country and/or second entity system are associated with real-time processing networks and are verified for conducting real-time resource events.

At Event 830, one or more processing parameters are determined. The processing parameters may include, but are not limited to, settlement rules, exchange rules (e.g., exchange rate rules, where exchange should occur and the like) and legal rules.

At Event 840, a resource event command is communicated to at least one of the first country's real time processing network or the second country's real-time processing network. In specific embodiments of the invention the processing command/message is communicated to the first country's real time processing network, which forwards the command to the second country's real-time processing network for subsequent processing of the resource event within the second country's real-time processing network. In addition, the processing command may include the processing parameters. In those embodiments of the invention, in which the resource event is a transaction/disbursement, the payment command can be communicated to either the first country's or second country's real-time payment network to authorize real-time payment processing.

Referring to FIG. 11 a block diagram of a high-level interconnected real-time processing system 900, in accordance with embodiments of the present invention. In the illustrated system 100, a first user 110A is associated with a first entity system 130 located in first country/geographic region 572 and a second user 110B is associated with a second entity system 140 located in a second country/geographic region 574. Each country/geographic region 572, 574 operates a real-time processing network 300A and 300B that are interconnected in a network-to-network manner and are configured to process, in real-time, a resource event 310, in which first user 100A is the resource provider and second user 100B is the resource recipient.

Thus, present embodiments of the invention providing systems, apparatus methods and/or the like for a virtual and/or tokenized resource instrument that is used for initiating the processing of a resource event. The resource instrument includes one or more unique coded identifiers that, upon decoding, identify the user conducting the resource event, as well as, provide the means for accessing the real-time processing network that is used to process, in real-time, the resource event. In addition, the resource instrument provides a means for verifying the identity of the user and, thus, authorizing the user to proceed with real-time processing of the resource event via the real-time processing network.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for initiating processing of a resource event, the system comprising:
a resource event instrument comprising at least one coded identifier that is configured to, upon decoding, identify (i) a user and (ii) a user-specific resource depository associated with the user and provide instructions for gaining access to a real-time processing network;
a computing platform including a memory and at least one processor in communication with the memory, wherein the memory stores instructions that are executable by the at least one first processor and configured to:
receive a resource event request that comprises (i) the at least one coded identifier, (ii) a resource volume associated with a resource event requested by the user and (iii) a resource recipient,
decode the at least one coded identifier to identify the user and the user-specific resource depository associated with the user and provide the instructions for gaining access to the real-time processing network,
in response to decoding, authenticate the user-specific resource depository by determining that the user-specific resource depository is valid and active,
in response to decoding, verify that the user-specific resource depository currently stores resources equal to or greater than the resource volume,
in response to receiving user identification credentials, authenticate the user,
in response to (i) authenticating the user-specific resource depository, (ii) verifying that the user-specific resource depository currently stores resources equal to or greater than the resource volume and (iii) authenticating the user, authorize the processing of the resource event via the real-time processing network, and
in response to authorizing the processing of the resource event via the real-time processing network, execute the instructions to access the real-time processing network and initiate communication of a real-time processing command to the real-time processing network that authorizes the real-time processing of the resource event,
wherein in response to communicating the real-time processing command to the real-time processing network (i) the resource event is irrevocable by the user, and (ii) the resource event is cleared in real-time.

2. The system of claim 1, wherein the at least one coded identifier of the resource event instrument is further configured to, upon decoding, identify processing instructions for the resource event.

3. The system of claim 2, wherein the processing instructions for the resource event include at least one selected from a group comprising (i) resource event routing instructions and (ii) resource clearing instructions.

4. The system of claim 2, wherein the instructions are further configured to:
decode the at least one identifier to identify the processing instructions for the resource event, and
communicate the real-time processing command to the real-time processing network that includes the processing instructions.

5. The system of claim 1, wherein the resource event instrument is at least one selected from a group comprising (i) a token, (ii) a virtual resource event card, and (iii) a physical resource event card.

6. The system of claim 1, wherein the instructions are further to authorize the user by at least one selected from a group comprising (i) comparing user-inputted user credentials to stored user credentials, (ii) comparing user-inputted personal data to stored personal data, and (iii) conducting multi-factor user authentication.

7. An apparatus for initiating processing of a resource event, the apparatus comprising:
a computing platform including a memory and at least one processor in communication with the memory, wherein the memory stores instructions that are executable by the at least one first processor and configured to:
receive a resource event request that comprises (i) at least one coded identifier, (ii) a resource volume associated with a resource event requested by a user and (iii) a resource recipient,
decode the at least one coded identifier to identify the user and a user-specific resource depository associated with the user and provide instructions for gaining access to the real-time processing network,
in response to decoding, authenticate the user-specific resource depository by determining that the user-specific resource depository is valid and active,
in response to decoding, verify that the user-specific resource depository currently stores resources equal to or greater than the resource volume,
in response to receiving user identification credentials, authenticate the user,
in response to (i) authenticating the user-specific resource depository, (ii) verifying that the user-specific resource depository currently stores resources equal to or greater than the resource volume and (iii) authenticating the user, authorize the processing of the resource event via the real-time processing network, and
in response to authorizing the processing of the resource event via the real-time processing network, execute the instructions to access the real-time processing network and initiate communication of a real-time processing command to the real-time processing network that authorizes the real-time processing of the resource event,
wherein in response to communicating the real-time processing command to the real-time processing network (i) the resource event is irrevocable by the user, and (ii) the resource event is cleared in real-time.

8. The apparatus of claim 7, wherein the instructions are further configured to decode the at least one coded identifier to identify processing instructions for the resource event.

9. The apparatus of claim 8, wherein the instructions are further configured to communicate the real-time processing command to the real-time processing network that indicates the processing instructions.

10. A computer-implemented method for closed loop resource event processing, the computer-implemented method is implemented by one or more processing devices and comprises:

receiving a resource event request that comprises (i) at least one coded identifier, (ii) a resource volume associated with a resource event requested by a user and (iii) a resource recipient;

decoding the at least one coded identifier to identify the user and a user-specific resource depository associated with the user and provide instructions for gaining access to the real-time processing network;

in response to decoding, authenticating the user-specific resource depository by determining that the user-specific resource depository is valid and active;

in response to decoding, verifying that the user-specific resource depository currently stores resources equal to or greater than the resource volume;

in response to receiving user identification credentials, authenticating the user;

in response to (i) authenticating the user-specific resource depository, (ii) verifying that the user-specific resource depository currently stores resources equal to or greater than the resource volume and (iii) authenticating the user, authorizing the processing of the resource event via the real-time processing network; and in response to authorizing the processing of the resource event via the real-time processing network, executing the instructions to access the real-time processing network and initiating communication of a real-time processing command to the real-time processing network that authorizes the real-time processing of the resource event, wherein in response to communicating the real-time processing command to the real-time processing network (i) the resource event is irrevocable by the user, and (ii) the resource event is cleared in real-time.

11. The computer-implemented method of claim 10, wherein decoding further comprises decoding the at least one coded identifier to identify processing instructions for the resource event and wherein communicating further includes communicating the real-time processing command to the real-time processing network that indicates the processing instructions.

* * * * *